United States Patent Office 2,885,865
Patented May 12, 1959

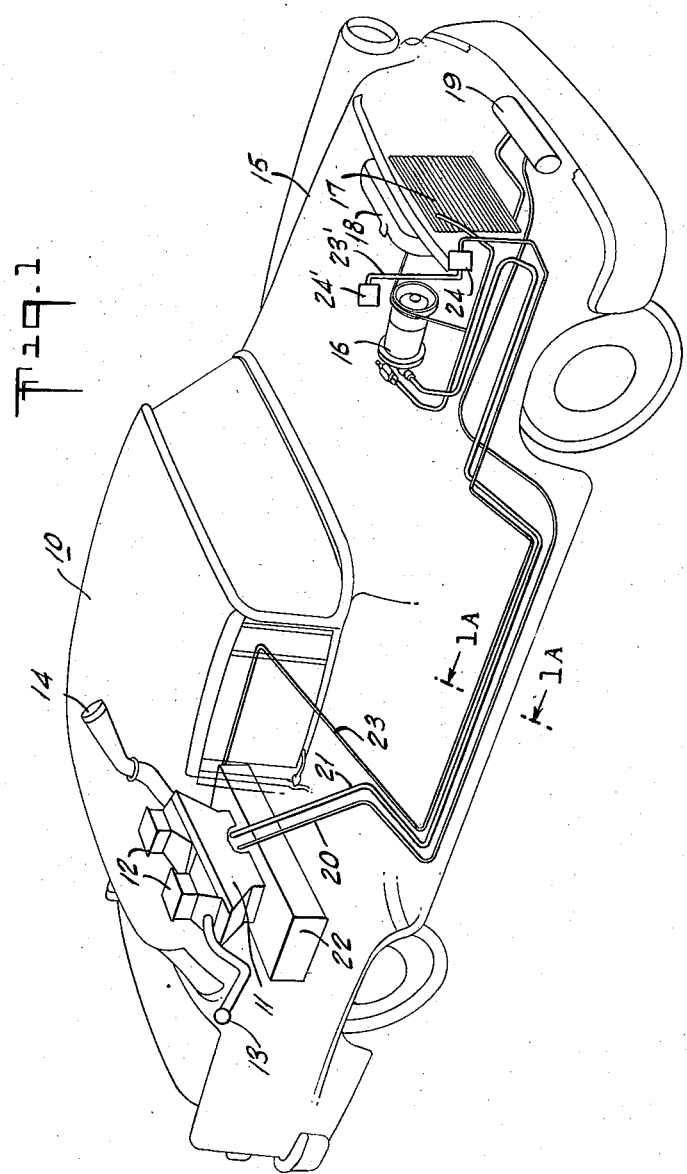

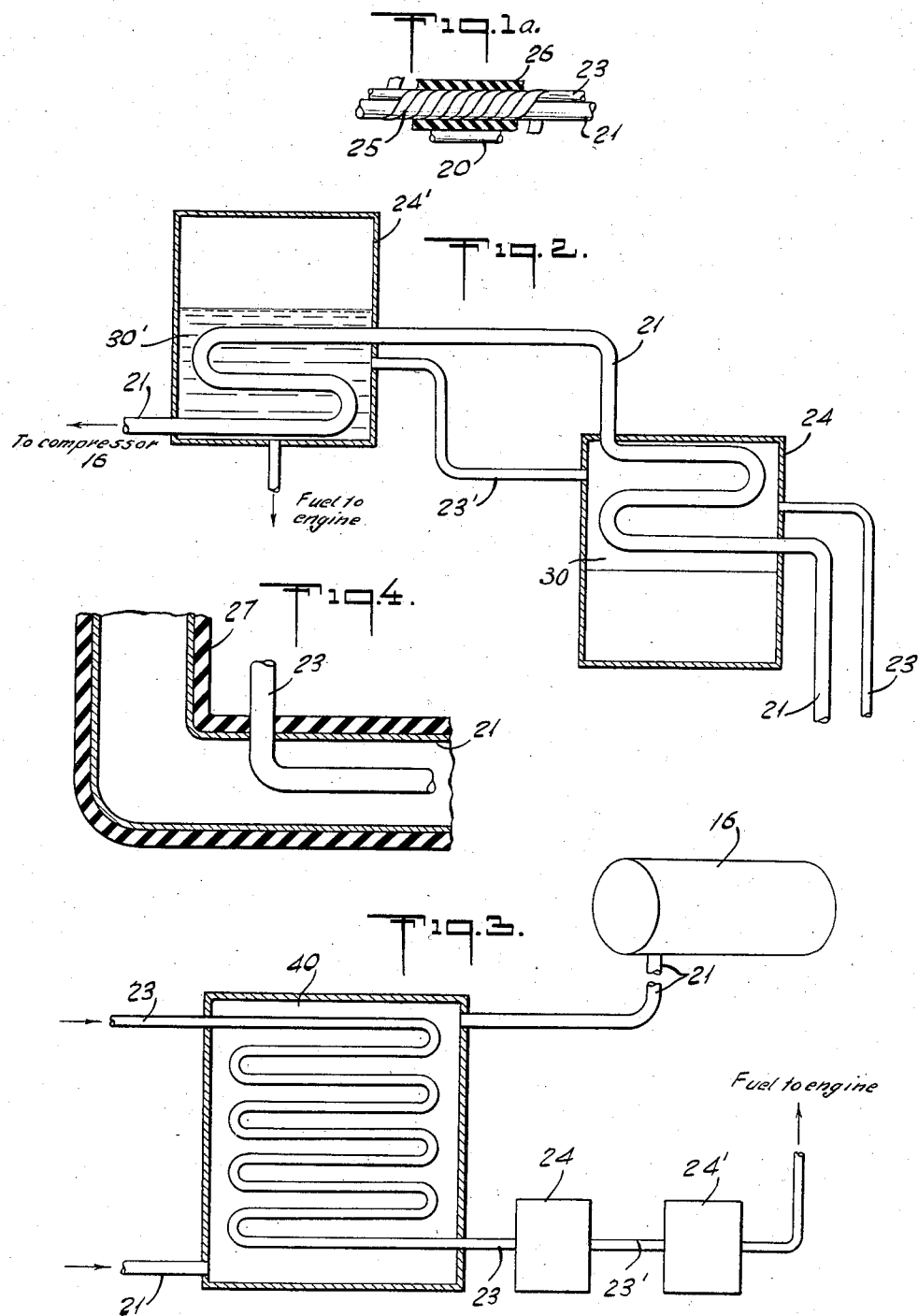

2,885,865

METHOD AND APPARATUS FOR REDUCING VAPOR LOCK TENDENCIES OF AIR CONDITIONED AUTOMOBILES

James R. Muenger and Herman I. Wilson, Beacon, N.Y., assignors to The Texas Company, New York, N.Y., a corporation of Delaware Application August 29, 1956, Serial No. 606,913

6 Claims. (Cl. 62—98)

This invention relates generally to air conditioned automotive vehicles, and particularly to a method and apparatus for reducing the vapor locking tendencies of such vehicles.

Vapor lock is faulty engine performance resulting from failure of the car fuel system to meter fuel properly because of excessive fuel prevaporization, the latter increasing with rising operating temperatures and the use of more volatile fuels.

The relatively recent introduction of air conditioning systems in passenger cars has significantly increased the vapor locking tendencies for automobiles so equipped. In many of these automobiles now on the road, the air conditioning system is arranged so that the evaporator assembly is located in the rear of the car, e.g. in the trunk, with the compressor in the engine compartment and the condenser mounted forward of the customary radiator. These latter two components interfere with the normal circulation of the engine cooling air, and in addition, reject heat into the engine compartment during the cooling operation. Unfortunately, both this heat rejection and the effect of interference in the air circulation increase with ambient temperature, as does also the normal vapor locking tendencies of the automobile on any given fuel.

Recent comparative tests between cars with and without air conditioning reveal a one-third reduction in vapor lock limitation measured in pounds Reid Vapor Pressure, a commonly used index in the measurement of fuel volatility for vapor locking tendencies. This decreased tolerance is attributed to restricted engine cooling and rejection of the air conditioning heat load into the engine compartment, and in typical cases amounts to as much as 2 pounds R.V.P. Such an effect presents a dilemma to a car purchaser who invests a considerable amount of additional money for an air conditioner to keep his car cool in hot weather only to find that, because of the air conditioner, the car operates poorly in hot weather.

It is generally accepted that vapor locking occurs mostly commonly at the fuel pump inlet. Three commonly recognized means of reducing vapor locking tendencies include (1) reduction of flow restrictions between the fuel tank and the fuel pump, (2) increasing the vapor handling capacity of the pump, and (3) decreasing the temperature of the fuel in the fuel lines and in the pumping and metering parts of the fuel system.

It is proposed that the air conditioning system itself be employed to correct the vapor locking stress it imposes upon the fuel system, by the use of the inherently available potential cooling capacity of the evaporator effluent flowing in the refrigerant return line. This would involve the third method mentioned above, care being taken not to increase the flow losses between the fuel tank and the pump, nor to decrease the vapor handling capacity of the fuel pump. In addition to or independently of the fuel lines cooling, the fuel chamber of the pump and/or the carburetor fuel chamber may be cooled by the evaporator return, and in a fuel injection system, comparable parts of the system would be cooled.

Accordingly, it is an object of the present invention to provide a method for reducing the vapor lock tendencies of air conditioned automobiles.

It is another object of invention to provide an apparatus for air conditioned automobiles to reduce the vapor locking tendency of the automobile.

Another object of invention is to provide a method and apparatus by which fuel volatility tolerance can be raised above that of a car without an air conditioner installation.

Still another object of invention is to provide for improved fuel volatility tolerance without the need of additional refrigeration.

These and other objects, features and advantages of the present invention will be apparent from the following description, drawings and claims of the presently preferred form of the invention in which:

Fig. 1 is a phantom view of an air conditioned automotive vehicle disclosing one form of the invention;

Fig. 1a is a view taken along line 1A—1A, showing the insulation of adjoining refrigerant and fuel lines;

Fig. 2 is a partial view showing another form of the invention;

Fig. 3 is an additional partial view disclosing still another form of the invention; and Fig. 4 is another partial view of a form of the invention.

It is proposed to reduce the car vapor locking tendencies by using the refrigerant returning from the evaporator of the car air conditioning system to cool fuel in the fuel system.

Referring to Fig. 1 of the drawings, there is disclosed an air conditioned automotive vehicle indicated generally at 10. The evaporator assembly providing cooling air to the automotive vehicle is shown at 11, with the interior air intake ducts disclosed at 12, an outside air intake scoop at 13 and an interior discharge at 14.

At the forward end of the car within the engine compartment indicated generally at 15, there is positioned the compressor assembly at 16 and the condenser at 17, the latter being located usually forward of the car radiator 18, and receiving the compressed refrigerant from the compressor and discharging the condensate into the reservoir or receiver at 19. The refrigerant lines which complete the system between the compressor and the evaporator are disclosed at 20 and 21, with the refrigerant return line being indicated by the latter.

A fuel tank is disclosed at 22, with a fuel line 23 leading therefrom to the engine compartment, ending at the fuel pump and carburetor assemblies, indicated respectively at 24 and 24′. The fuel line 23 is positioned close to the refrigerant return line 21, and for more effective cooling and heat transmission between the fuel line and the refrigerant return line, both lines are insulated by means as disclosed in the sectional view of Fig. 1a showing lines 21 and 23 wrapped in aluminum foil and then enclosed in a sleeve of asbestos or rubber, shown respectively at 25 and 26. Other insulating means are permissible and may extend from the initial contiguity of the fuel and refrigerant return lines to the immediate vicinity of the juncture of the fuel line with the fuel pump and between the pump and carburetor, which may be insulated similarly.

Fig. 2 discloses additional means by which the returning refrigerant may be used to cool the fuel in the fuel chambers of the pump and carburetor assemblies. This comprises the use of heat exchanger structures disclosed diagrammatically and generally indicated at 30 and 30′, for the fuel pump and carburetor assemblies 24 and 24′, with the refrigerant return line at 21 and the fuel lines at 23 and 23', the latter interconnecting the assemblies. This additional cooling structure is most advantageous when the air conditioner is kept in operation while the motor vehicle is parked, e.g. at an outdoor movie.

Fig. 3 discloses the use of a heat exchanger 40, the enumeration being the same for the same elements described previously. This heat exchanger may be positioned adjacent the fuel tank 22, where the fuel line 21 starts, or alternatively, it may be located adjacent the fuel pump 24, and can be used with or without the insulation of the contiguous lines or the refrigerant cooled pump and carburetor assemblies.

Another alternative structure is disclosed in Fig. 4 with the coolant and fuel lines concentrically disposed and insulated, to provide a form of heat exchange structure, an insulation sleeve being shown at 27.

Although the disclosed embodiments of the invention show the use of the refrigerant return line for the cooling of the fuel, it is to be understood that such cooling may be accomplished alternatively with the liquid refrigerant in line 20, by the use of customary refrigeration techniques well known in the art.

Thus, there has been disclosed a method and apparatus by which the vapor lock limited volatility restrictions due to installation and operation of car air conditioners has been overcome even with the most restrictive conditions of extended idling or high engine load operation, thus permitting an increased tolerance of fuel volatility which may be greater than the restrictions imposed originally. With a suitably designed heat exchange structure, air conditioning becomes an instrument of overcoming vapor locking tendencies whether deriving from air conditioning load or possibly other sources, without additional refrigeration or engine load.

Obviously, many modifications and variations of the invention, as hereinbefore set forth, may be made without departing from the spirit and scope thereof, and therefore only such limitations should be imposed as are indicated in the appended claims.

We claim:
1. Means for reducing vapor locking tendencies in an automotive vehicle comprising in combination, an air conditioning system having an evaporator, a compressor, and a refrigerant return line interconnecting both, and a fuel system having a fuel reservoir, fuel pump and carburetor assemblies and fuel lines interconnecting said fuel reservoir and said assemblies, said refrigerant return line and said fuel lines being in heat exchange relationship with each other, whereby fuel in said fuel lines is cooled and the vapor locking tendencies of said vehicle are reduced.

2. In the combination as defined in claim 1, said fuel pump and carburetor assemblies being disposed in heat exchange relationship with said refrigerant return line thereby to further cool the fuel in said fuel system.

3. In the combination as defined in claim 1, said heat exchange relationship comprising the contiguous positioning of the refrigerant return and fuel lines and enclosing both by insulating means.

4. A combination for increasing fuel volatility tolerance comprising an automotive vehicle having an air conditioning system and a fuel system, said air conditioning system comprising an evaporator, a compressor in the engine compartment of said automotive vehicle, and a refrigerant return line joining said evaporator and said compressor, said fuel system comprising a fuel reservoir, a fuel line leading therefrom, and fuel pump and carburetor assemblies adjacent said compressor in said engine compartment and joined to said fuel line, and a heat exchanger, said refrigerant return line and said fuel line being interconnected to said heat exchanger thereby to cool the fuel in said fuel system and so increase the fuel volatility tolerance of the vehicle.

5. In the combination as defined in claim 4, said refrigerant return line and said fuel line being contiguous and covered by insulating means, and said fuel pump and carburetor assemblies being in heat exchange relationship with said refrigerant return line.

6. The method for improving the fuel volatility tolerance of an automotive vehicle comprising flowing a refrigerant between the compressor and evaporator assemblies of a closed cycle air conditioning system used in said automotive vehicle, and passing the fuel provided the engine of said vehicle in heat exchange relationship with said refrigerant flowing between said assemblies for cooling by said refrigerant returning from the evaporator assembly of said air conditioning system.

References Cited in the file of this patent

UNITED STATES PATENTS

| | | |
|---|---|---|
| 1,905,971 | Davidson | Apr. 25, 1933 |
| 1,953,809 | Kenneweg | Apr. 3, 1934 |
| 1,974,586 | Prentiss | Sept. 23, 1934 |
| 2,120,779 | Ericson | June 14, 1938 |
| 2,699,043 | Kramer | Jan. 11, 1955 |